April 2, 1940.     F. B. KENT     2,195,702
EGG REGISTERING MEANS
Filed Aug. 22, 1938     4 Sheets-Sheet 1

April 2, 1940.                F. B. KENT                2,195,702
                          EGG REGISTERING MEANS
                       Filed Aug. 22, 1938    4 Sheets-Sheet 2

INVENTOR F. B. Kent
By H. B. Wilson Yeo
   Attorneys

April 2, 1940.   F. B. KENT   2,195,702
EGG REGISTERING MEANS
Filed Aug. 22, 1938   4 Sheets-Sheet 3
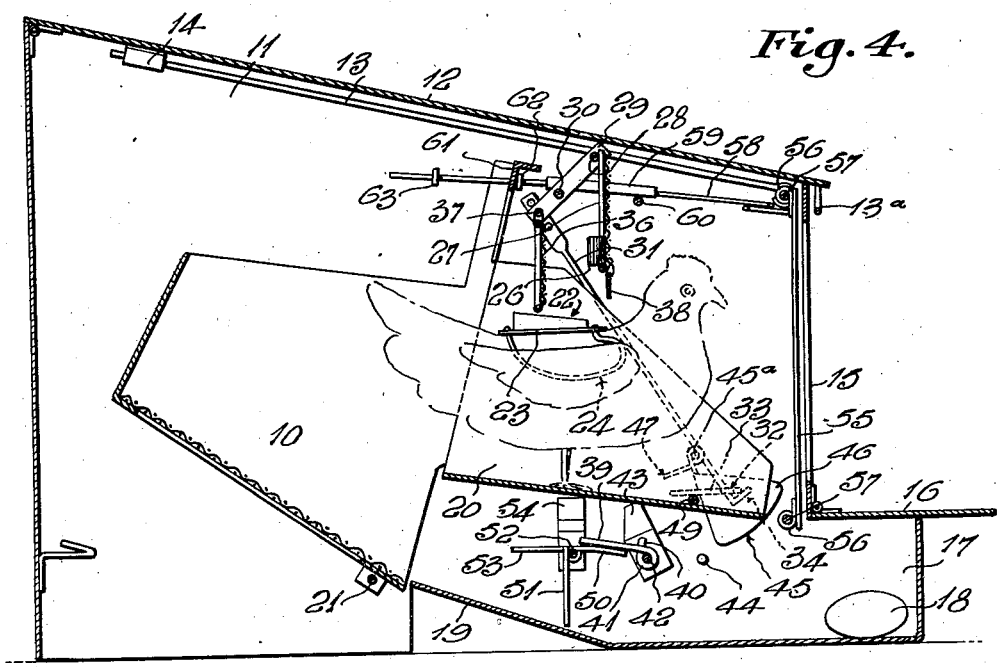

April 2, 1940.                F. B. KENT                2,195,702
                        EGG REGISTERING MEANS
                    Filed Aug. 22, 1938        4 Sheets-Sheet 4

Inventor
F. B. Kent
By H. B. Wilson Yeo
Attorneys

Patented Apr. 2, 1940

2,195,702

UNITED STATES PATENT OFFICE 2,195,702

EGG REGISTERING MEANS

Fred B. Kent, Columbia, Miss.

Application August 22, 1938, Serial No. 226,160

7 Claims. (Cl. 235—92)

The invention relates to new and improved means for registering the number of eggs laid by each of a plurality of hens, and it includes registers carried by the hens, and actuating means for said registers adjacent the path on which the hens leave a specially provided nest.

The principal object of the invention is to make unique provision whereby the register of any hen will be operated to show the next consecutive number, only if said hen has laid while in the nest. Thus, by periodically reading the registers of the various hens, the best layers may be easily distinguished from the others.

With the foregoing and numerous ancillary objects in view the invention resides in the novel subject matter hereinafter described and claimed, description being accomplished by reference to the accompanying drawings.

Fig. 4 is a view similar to Figs. 2 and 3 but showing the movements of parts which occur when a hen leaves the nest without laying.

Fig. 5 is a view similar to Fig. 2 but illustrating the manner in which the register of a hen is operated as she leaves the nest, if she has laid therein.

Fig. 6 is a vertical transverse sectional view on line 6—6 of Fig. 2.

Figs. 7 and 8 are fragmentary sectional perspective views more clearly showing the construction of a plurality of the movable parts of the controlling mechanism for the register actuator.

Fig. 9 is a perspective view of one of the registers.

Figure 1:
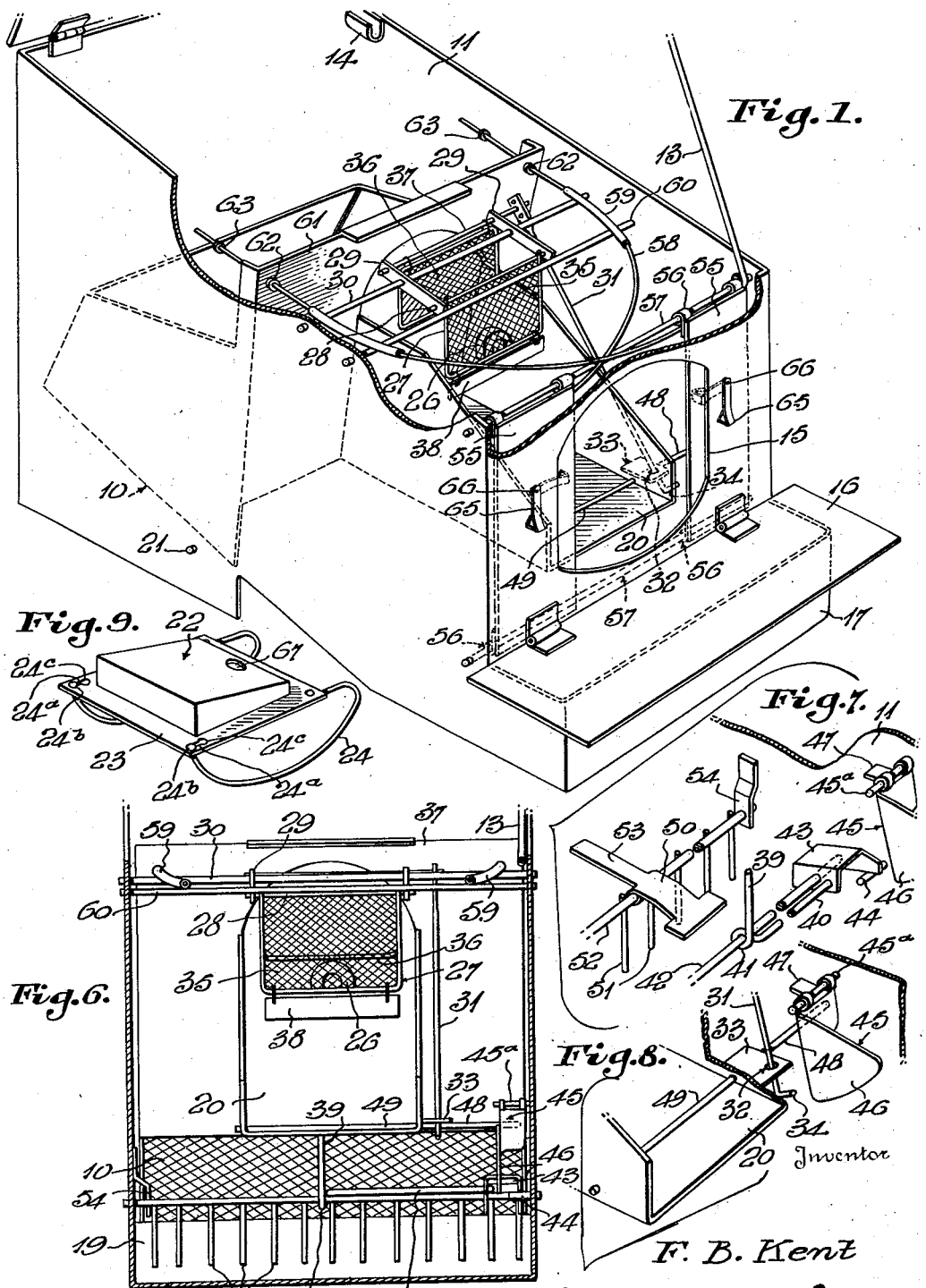
Fig. 1 is a perspective view with the cover of the nest casing swung upwardly, part of the front wall of said casing being broken away and in section.

A preferred construction has been illustrated and will be rather specifically described, with the understanding however, that within the scope of the invention as claimed, numerous variations may be made.

A nest 10 is provided within a suitable casing 11, said casing preferably having a hinged top 12 and a pivoted prop 13 for holding this top in elevated position when desired, said prop being normally engaged with a suitable supporting hook or the like 14 within the casing but being swingable upwardly out of said casing to prop the top in raised position when desired, said top being provided with any suitable means 13ª to anti-slippingly engage said prop.

The front of the casing 11 is provided with an entrance and exit opening 15 and with a ledge 16 at the lower end of said opening, said ledge preferably constituting an upwardly swingable cover for a compartment 17 to receive the eggs 18, said eggs being discharged from the nest 10 into the compartment 17 through a suitable chute 19.

An entrance and exit hall 20 is also provided within the casing 11, said hall and the nest 10 being so connected with each other and so mounted that when either one is depressed under the weight of a hen, the other will be raised. In the present showing, the hall 20 is rigidly joined to the front of the nest 10 and the latter is pivoted upon a transverse rod 21.

One of the registers to be carried by the hens, is shown at 22, mounted upon a saddle plate 23 to be secured upon a hen's back by wires or the like 24 encircling the wings at their juncture with the body. The register 22 is provided with an enclosed operating member 25 (Figs. 10 and 11) which operates said register to show the next consecutive number, and an actuator 26 is disposed in the upper portion of the hall 20 to actuate said operating member 25 in the required manner as a hen which has laid an egg in the nest, leaves said nest, as shown in Fig. 5. The operating member 25 is preferably in the form of an armature and the actuator 26 is then in the form of a magnet, either of permanent or electrical type. Novel provision is made, as hereinafter described, to prevent the actuator 26 from actuating the operating member 25 and causing operation of the register 22 when any hen enters the nest, and additional provision is made for raising the actuator 26 to an inoperative position in which it cannot work the operating member 25 of the register if a hen leaves the nest without laying. If the hen does lay, the actuator 26 actuates the operating member 25 as she leaves the nest, thus causing operation of the register 22. It will thus be seen that the registers of the various hens will be operated only when the hens actually lay in the nest, and no matter how many times they may enter and leave the nest without laying therein, their registers will not be operated. Thus, by periodically reading the registers of the various hens, the actual number of eggs which they have laid may be ascertained, and the best layers may therefore be readily distinguished from the others.

In the present disclosure, the actuator 26 is carried by a U-shaped frame 27 which is pivotally hung upon a rod 28, said rod being carried by the front ends of two vertically swingable levers 29 which are fulcrumed upon a transverse rod 30 extending across the casing 11 above the hall 20. A pull-rod 31 is pivoted to the rear end of one of these levers 29 and passes slidably through an opening 32 in a flange 33 projecting laterally from the hall 20, the lower end of said pull-rod 31 being bent laterally at 34 to be struck by said flange 33 when the hall 20 is permitted to move downwardly to the maximum. This maximum downward movement of the hall 20 is permitted only when a hen leaves the nest without laying, and when said movement occurs, the flange 33 pushes downwardly upon the lateral end 34 of the rod 31, pulling the latter downwardly as seen in Fig. 4 and consequently swinging the levers 29 upwardly to raise the frame 27 and the actuator 26, positioning the latter in a raised inoperative position in which it is above the path of the operating member 25 of the register 22 carried by the outgoing hen. Consequently, a hen which has not laid in the nest while occupying the same, may leave said nest without causing her register to be operated.

A barrier 35 of screen wire or the like is secured to the frame 27 and a guard 36 of screen wire or the like is preferably hung pivotally from a rod 37 which extends between the rear ends of the levers 29, the pull-rod 31 being preferably connected with one end of this rod 37, as shown most clearly in Figs. 1 and 6. When a particularly large or tall hen leaves the nest without laying, she pushes against the guard 36, swinging it forwardly under the actuator 26 and overcoming any possibility of said actuator actuating the operating member 25. However, it will be obvious that if the parts be proportioned to raise the actuator 26 to an extent which would preclude any possibility whatever of said actuator actuating the operating member 25, the guard 36 could be dispensed with.

A guard 38 of copper or any other desired material which will not be attracted by the magnetic actuator 26, is pivotally hung from the lower end of the frame 27. When a hen enters under this frame and swings it inwardly, her register strikes the guard 38 and causes it to swing inwardly under the actuator 26, preventing the latter from actuating the operating member 25 of said register. I do not expect this guard 38 to actually prevent the magnetic flux of the actuator 26 from reaching the enclosed operating member 25 as the hen enters the nest, but the magnetic strength of said actuator is such that it must come in closer proximity to said operating member than permitted by said guard 38, in order to actuate said operating member.

Figure 2:
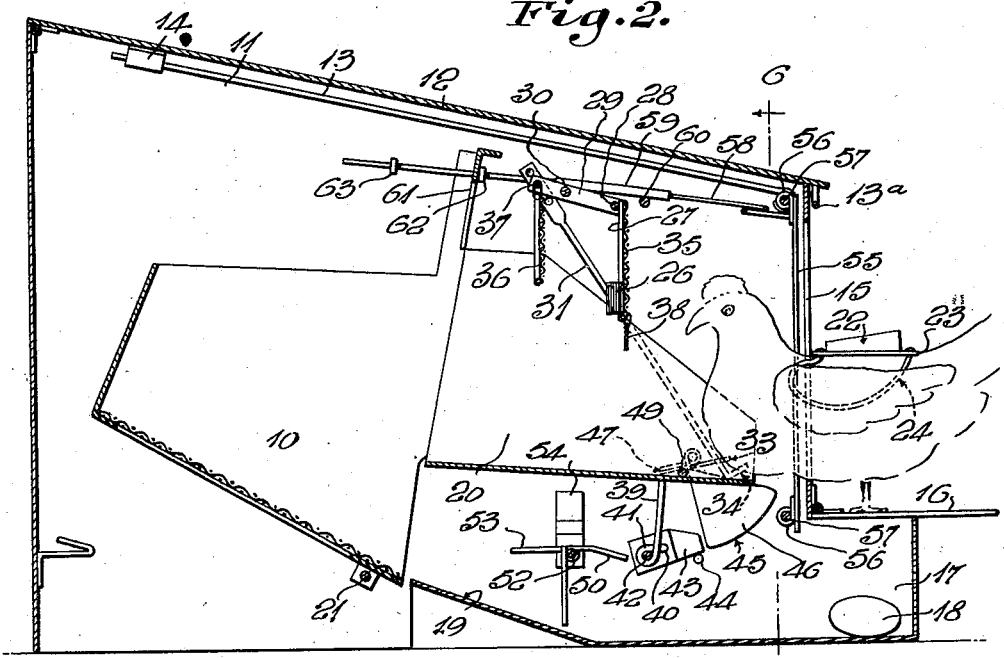
Fig. 2 is a central vertical longitudinal sectional view showing a hen about to enter the nest, the parts being shown in the relative positions in which they were left by a preceding hen which laid an egg while in the nest.
Figure 3:
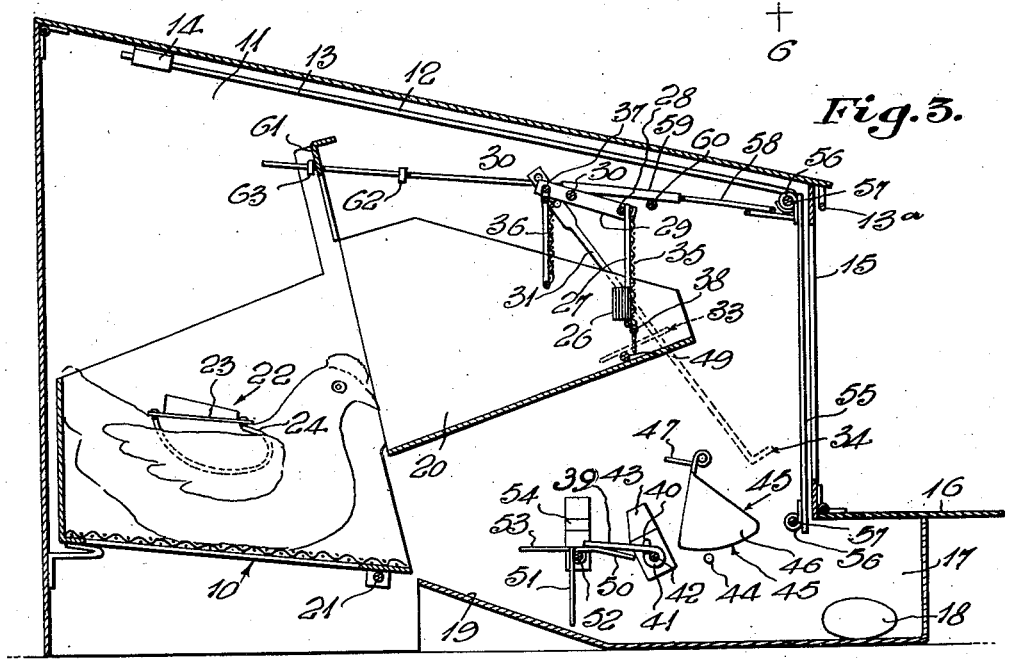
Fig. 3 is a view similar to Fig. 2 showing the hen in the nest and illustrating the relation of parts which always exist when said nest is occupied.

A vertically swingable stop arm 39 is provided under the hall 20, said arm being swingable from a lowered inoperative position as seen in Figs. 3 and 4, to a raised operative position as seen in Figs. 2 and 5, and vice versa. When a hen enters the nest 10 and depresses the latter, the stop arm 39 is automatically moved to its lowered inoperative position (if left in its raised operative position when the preceding hen left the nest) and if said stop arm was left in its lowered inoperative position when the preceding hen left the nest, it remains in this position when the next hen enters said nest. Moreover, the stop arm 39 remains in this lowered inoperative position when the hen leaves the nest, unless she lays an egg in said nest. If she lays, the freshly laid egg rolls down the chute 19 into the compartment 17 and in so doing, automatically raises the arm 39 to the operative position shown in Figs. 2 and 5. Consequently, when this laying hen leaves the nest, the arm 39 prevents maximum depression of the hall 20, with the result that said hall cannot operate the pull-rod 31 to effect raising of the actuator 26. It thus follows that said actuator will actuate the register-operating member 25 as the hen leaves the nest (see Fig. 5) thus actuating said operator to cause the register 22 to show the next consecutive number.

In the present disclosure, the stop arm 39 is formed by one end of a piece of wire 40 bent into substantially right angular form and having an eye 41 at its angle, said eye pivotally surrounding a transverse rod 42 which extends between and is secured to the side walls of the casing 11. The other end portion of the wire 40 is substantially parallel with the rod 42 and is secured to a resetting arm 43 which, in the present disclosure, is formed from sheet metal and is rockably mounted upon said rod 42. When the arm 39 stands in raised operative position, its resetting arm 43 lies upon a stop pin 44 carried by one side wall of the casing 11, as seen in Figs. 2, 5 and 7.

A movably mounted operating member 45 is provided for the resetting arm 43. In the present showing, this operating member 45 is pivotally hung from a stud 45ª projecting from one side wall of the casing 11, said operating member 45 being preferably formed from a single piece of sheet metal and having a weighted lower portion 46 and an upper lateral projection 47. Cooperable with this projection 47 is a lateral arm 48 on the hall 20, said arm 48 being preferably formed by one end portion of a stiff wire rod 49 which extends through the side walls of said hall and is suitably secured thereto. When the parts occupy the positions shown in Figs. 2, 4, 5 and 8, the rear edge of the weighted portion 46 of the member 45 rests against the arm 48 and the latter is, therefore, in readiness to strike the projection 47 as ascent of the hall 20 occurs. Whether the hall 20 move upwardly to the Fig. 3 position or again downwardly to the Fig. 4 position, the arm 48 engages the projection 47 and swings the operating member 45. The swinging movement of this operating member 45 is idly toward the front of the casing 11 (to permit 48 to pass 47) when the hall 20 moves downwardly from the Fig. 3 position, and said movement of said member 45 is toward the rear end of said casing 11 when said hall moves upwardly from the Fig. 4 position or the Fig. 3 position. The lower end of the member 45 is so positioned that the rear edge of its weighted portion 46 will upwardly and rearwardly strike the upper transverse horizontal front edge of the resetting arm 43 when said member 45 is swung rearwardly. The upper transverse horizontal front edge of the arm 43, just referred to, is spaced upwardly from and behind the pin 44 upon which the arm 43 normally rests, as shown most clearly in Fig. 7. The rearward swinging of the member 45 takes place each time the nest 10 is depressed by the weight of the hen entering the same. It thus follows that if the stop arm 39 occupied its raised operative position (Fig. 2) when the hen entered the nest, said stop arm 39 is reset to its lowered inoperative position (see Fig. 3) as soon as the nest 10 is depressed by the weight of the hen. The hen always enters with the hall 20 in one of its lowered positions and the arm 48 projecting laterally from said hall, then always underlies the projection 47 of the member 45. As soon as depression of the nest 10 causes ascent of the hall 20, the arm 48 strikes the projection 47 of the member 45, thereby rearwardly swinging this member and causing it to upwardly swing the resetting arm 43, this arm then causing resetting of the stop arm 39 to its lowered position. In Fig. 3, these operations have just occurred.

A setting arm 50 is provided for the stop arm 39, and when said stop arm is in lowered position, it lies upon said setting arm as shown in Figs. 3 and 4. So connected with this setting arm 50 as to operate the same, are a number of arms 51 which project downwardly into the egg chute 19 through which any freshly laid egg leaves the nest 10. As soon as a hen has laid in this nest and rises to leave the nest, the newly laid egg rolls down the chute 19, engaging the arms 51 and effecting upward swinging of the setting arm 50, with the result that said setting arm upwardly throws the stop arm 39 to the position shown for instance in Fig. 5. As the hen now leaves the nest, this stop arm 39 prevents maximum depression of the hall 20 with the result that said hall cannot operate the pull-rod 31 to effect raising of the actuator 26. Consequently, this actuator will attract the operating member 25 of the register 22 and will operate said member 25 as the hen leaves the hall, causing said register to show the next consecutive number.

As the stop arm 39 is swung upwardly to its operative position, only by means of a freshly laid egg, the hall 20 is held against maximum depression only when a hen lays an egg in the nest 10, and if said stop arm 39 be not swung to said operative position, any hen leaving the nest will depress the hall 20 to the maximum, thereby causing operation of the pull-rod 31 to raise the actuator 26 to the inoperative position of Fig. 4, in which it will not cause operation of the register 22. It will thus be seen that the registers of hens which enter and leave the nest without laying, will not be operated, whereas the registers of the hens which enter the nest and do lay therein, will be operated. It is thus an easy matter to distinguish the best layers from the others, and moreover, the reading of any hen's register will show the actual number of eggs she has laid since the initial or any subsequent resetting of said register.

While the operation would probably be clear from the foregoing, it may be condensed for convenience, as follows. Whenever a hen enters, the hall 20 is in one of its lowered positions, being left in this position by the last hen leaving the nest. Whether this hall be in the lowered position of Fig. 2 or in the maximum lowered position of Fig. 4, the lateral arm 48 on said hall is disposed below the projection 47 of the swingable member 45. Thus, as soon as the hen enters the nest 10 and depresses the latter, causing ascent of the hall 20, said arm 48 will engage said projection 47 and rearwardly swing the member 45. If the stop arm 39 be then already in its lowered position (Fig. 3 or Fig. 4), the swinging of the member 45 is of course idle. However, if said stop arm 39 is in its raised position when member 45 is swung rearwardly, said member engages the resetting arm 43, rearwardly swings the latter and restores the stop arm to the lowered position of Fig. 3 for instance, in which it rests upon the setting arm 50. The parts are thus so set (by depression of the nest 10 under the hen's weight) that the hall 20 may downwardly move to the maximum as the hen leaves the nest, if she does not deposit an egg in the latter. Such maximum depression of the hall 20 pulls upon the rod 31 and causes such swinging of the levers 29 as to raise the frame 27 and the actuator 26 to inoperatively position the latter so that it cannot operate the hen's register as she leaves the nest (see Fig. 4). However, if the hen lays in the nest 10, the egg rolls down the chute 19 and so operates the arms 51 as to cause the setting arm 50 to set the stop arm 39 in the raised operative position of Figs. 2 and 5. Therefore, when this laying hen leaves the nest, she cannot depress the hall 20 to the maximum, the result being that the actuator 26 remains in its lowered operative position and effects operation of the hen's register as she leaves.

When the nest 10 is in its depressed position (Fig. 3), the lateral arm 48 of the hall 20 is of course above the projection 47 of the member 45 but when said hall is lowered as the hen leaves the nest, said arm 48 strikes the top of said projection 47 and idly swings said member 45 until said arm passes said projection, the weighted portion 46 of said member 45 then restoring it to normal position with projection 47 in the path upon which arm 48 must ascend the next time the nest 10 is depressed and the hall 20 consequently raised.

I prefer to secure the setting arm 50 and the operating arms 51 for said setting arm to a transverse rock shaft 52 and to provide said rock shaft with a rearwardly projecting counter-balancing arm 53, the shaft 52 being mounted in appropriate bearings 54 carried by the side walls of the casing 11.

It is preferable in connecting the saddle plate attaching wires 24, to provide slots 24ª in one end of said plate, to permanently connect one end of the wires 24 to the other end of said plate, and to provide the other ends of said wires with heads 24ᵇ upwardly insertible through the enlarged ends 24ᶜ of said slots. Thus, by using resilient wires, their headed ends will move into the small ends of the slots and remain, after insertion through the slot ends 24ᶜ, and the register can be both easily attached and detached.

In connection with the features of construction above described, I preferably provide two sliding doors 55 for the opening 15, the upper and lower ends of said doors being provided with suitable guides 56 loosely slidable upon transverse guide rods 57. Two crossed push-and-pull wires 58 are connected with the upper ends of the doors 55 respectively and pass through suitable guides 59. These guides are preferably tubular and they may be secured at one end upon the rod 30 and at the other end upon a specially provided rod 60. The rear portions of the wires 58 pass slidably through openings in the front wall 61 of the nest 10 and are provided with collars 62 and 63 in front of and behind said wall, respectively. Whenever the hall 20 is in lowered position, the doors 55 are open, the wall 61 then contacting with the front collars 62. When a hen enters and depresses the nest 10 however, the wall 61 engages the rear collars 63, pulling upon the wires 58 to close the doors 55. As the hen leaves the nest and causes depression of the hall 20, the wall 61 engages the collars 62, forwardly pushing the wires 58 to again open the doors 55.

Should it be desired to use the nest as a trap nest from which it would be necessary to manually remove any hen entrapped therein, suitable latches 65 may be employed to automatically latch the doors 55 in closed position. These latches may well be pivotally mounted at 66 and of such nature that when they are swung to horizontal position, they are in readiness for operation, said latches, however, when swung to vertical position, being held against engagement with the doors.

Figure 10:
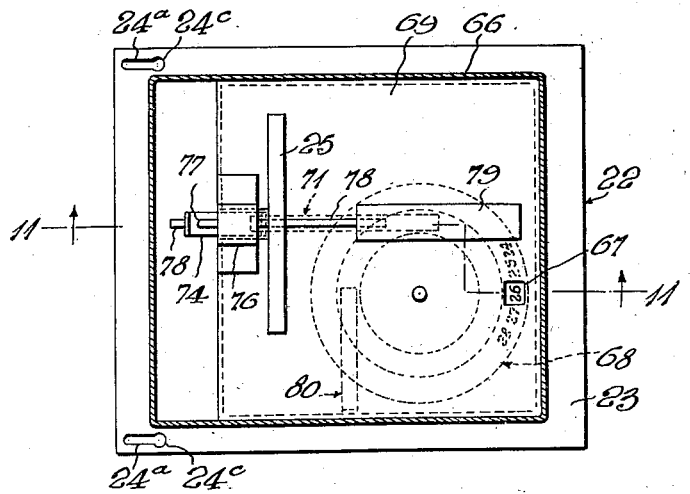
Fig. 10 is a horizontal sectional view showing the preferred construction of the register.
Figure 11:
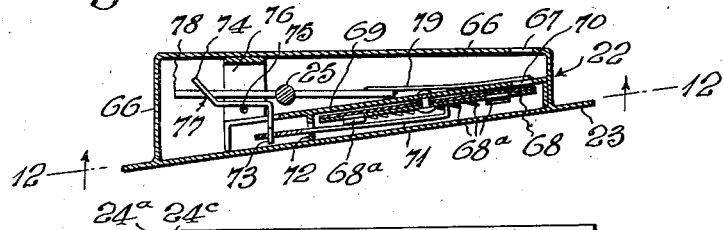
Fig. 11 is a vertical longitudinal sectional view on line 11—11 of Fig. 10.
Figure 12:
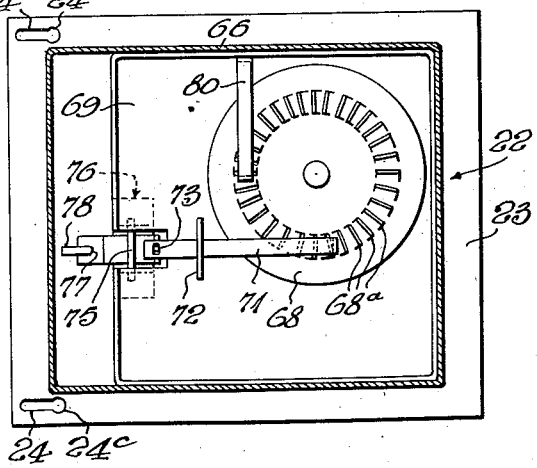
Fig. 12 is a horizontal sectional view on line 12—12 of Fig. 11.

The preferred construction for the register 22 is shown in Figs. 10, 11 and 12. From these views, it will be seen that a shallow metal casing 66 is mounted upon the saddle plate 23, the top of said casing being provided with a view opening 67 through which consecutive numbers on a register disk 68 are visible. This register disk is rotatably mounted, in the present disclosure, upon the lower side of a supporting plate 69 and this plate must, when this construction is followed, be provided with a view opening 70 registering with the view opening 67. A resilient metal pawl 71 is mounted for reciprocation in a suitable guide 72 projecting downwardly from the supporting plate 69, said pawl being cooperable with the ratchet teeth 68ª to rotate the register disk 68 in a step-by-step manner. The pawl 71 is operatively connected at 73 with a bell crank lever 74 fulcrumed at 75 in a suitable bracket 76, said bell crank being operatively connected at 77 with a lever 78 having a spring metal terminal 79 soldered or otherwise secured upon the upper side of the supporting plate 69. This lever 78 carries the armature 25 which is preferably in the form of a cross arm on said lever. Each time the armature 25 is upwardly attracted, the lever 78 swings the bell crank 74 to slide the pawl 71, turning the register disk 68 "one notch" to disclose the next number at the view opening 67. A suitable dog 80 is provided, cooperable with the ratchet teeth 68ª to hold the disk 78 against retrograde rotation. All parts, being housed in the casing 66, are protected for trouble-free operation, it being of course understood that the view opening 67 may be provided with a transparent closure if desired.

It will be seen from the foregoing that novel and advantageous provision has been made for carrying out the objects of the invention, and while certain specific features of construction have been disclosed for illustrative purposes, attention is again invited to the possibility of making numerous variations within the scope of the invention as claimed.

I claim:

1. In a mechanism of the type having a nest, depressible exit means for said nest, a hen-carried register, an actuator for said register, means whereby vertical movement of said exit means will effect movement of said actuator to and from an operative position in which it may operate the register of an outgoing hen, and a stop movable to an operative position in which it prohibits depression of said exit means to such an extent that said exit means will not change the position of said actuator; a chute through which each freshly laid egg leaves said nest, and a stop-setting device operatively associated with said stop and having an egg-actuated operating portion in said chute for moving said stop to its operative position, whereby a hen which has laid cannot depress said exit means and disturb said actuator, the latter being then in said operative position in readiness to actuate the hen's register.

2. In a mechanism of the type having a nest, depressible exit means for said nest, a hen-carried register, an actuator for said register, and means whereby vertical movement of said exit means will effect movement of said actuator to and from an operative position in which it may operate the register of an outgoing hen; a chute through which each freshly laid egg leaves said nest, a pivotally mounted stop arm swingable from a lowered inoperative position to a raised operative position in which it limits depression of said depressible exit means to an extent in which it will not change the position of said actuator, means for swinging said stop arm to said lowered inoperative position if the hen enters the nest with said stop arm raised, and means actuated by an egg leaving the nest through the chute for again swinging said stop arm to its raised operative position, whereby a hen which has laid cannot depress said exit means and disturb said actuator, the latter being then in said operative position in readiness to actuate the hen's register.

3. In a mechanism of the type having a nest, depressible exit means for said nest, a hen-carried register, an actuator for said register means whereby vertical movement of said exit means will effect movement of said actuator to and from an operative position in which it may operate the register of an outgoing hen; a chute through which each freshly laid egg leaves said nest, a pivotally mounted stop arm swingable from a lowered inoperative position to a raised operative position in which it limits depression of said depressible exit means to an extent in which it will not change the position of said actuator, means for swinging said stop arm to said lowered inoperative position if the hen enters the nest with said stop arm raised, a rock shaft transverse to said chute and having a setting arm upon which said stop arm lies when the latter is in said lowered inoperative position, and an operating arm on said rock shaft extending into said chute in position to be struck by an egg leaving the nest through said chute, said operating arm then serving to rock said shaft to swing said stop arm to said raised operative position, whereby a hen which has laid cannot depress said depressible exit means and disturb said actuator, the latter being then in said operative position in readiness to actuate the hen's register.

4. In a mechanism of the type having a nest, depressible exit means for said nest, a hen-carried register, an actuator for said register, and means whereby vertical movement of said exit means will effect movement of said actuator to and from an operative position in which it may operate the register of an outgoing hen; a chute through which each freshly laid egg leaves said nest, a pivotally mounted stop arm swingable from a lowered inoperative position to a raised operative position in which it limits depression of said depressible exit means to an extent in which it will not change the position of said actuator, a resetting arm operatively connected with said stop arm for swinging the latter to its lowered inoperative position, an operating member for said resetting arm, means for so moving said operating member as to cause it to swing said resetting arm to effect swinging of said stop arm to its lowered inoperative position if the hen enters the nest with said stop arm in raised position, and means actuated by an egg leaving the nest through said chute for swinging said stop arm to said raised operative position, whereby a hen which has laid cannot depress said depressible means and disturb said actuator, the latter being then in readiness to actuate the hen's register.

5. In a mechanism of the type having a nest, depressible exit means for said nest, a hen-carried register, an actuator for said register and means whereby vertical movement of said exit means will effect movement of said actuator to and from an operative position in which it may operate the register of an outgoing hen; a chute through which each freshly laid egg leaves said nest, a pivotally mounted stop arm swingable from a lowered inoperative position to a raised operative position in which it limits depression of said depressible exit means to an extent in which it will not change the position of said actuator, a resetting arm operatively connected with said stop arm for swinging the latter to its lowered inoperative position, an operating member for said resetting arm, means for so moving said operating member as to cause it to swing said resetting arm to effect swinging of said stop arm to said lowered inoperative position if the hen enters the nest with said stop arm in raised position, a rock shaft transverse to said chute and having a setting arm upon which said stop arm lies when the latter is in said lowered inoperative position, and an operating arm on said rock shaft extending into said chute in position to be struck by an egg leaving the nest through said chute, said operating arm then serving to swing said stop arm to said raised operative position, whereby a hen which has laid cannot depress said exit means and disturb said actuator, the latter being then in said operative position in readiness to actuate the hen's register.

6. In a mechanism of the type having a nest, depressible exit means for said nest, a hen-carried register, an actuator for said register, and means whereby vertical movement of said exit means will effect movement of said actuator to and from an operative position in which it may operate the register of an outgoing hen; a stop arm under said depressible exit means, said stop arm being swingable from a lowered position in which it allows maximum depression of said exit means to a raised position in which it limits depression of said exit means to an extent in which it will not change the position of said actuator, a resetting arm operatively connected with said stop arm, an operating member for said resetting arm, coacting means on said operating member and exit means for moving the former to downwardly swing said stop arm to its inoperative position each time said exit means returns to raised position after being depressed, a chute through which an egg laid in said nest rolls therefrom, a setting arm upon which said stop arm lies when in its downwardly swung position, and an operating arm connected with said setting arm and extending into said chute, said operating arm being effective when swung by an egg leaving the nest through said chute to upwardly swing said setting arm, causing the latter to swing said stop arm upwardly to its operative position, whereby if the hen lays in the nest she cannot depress said exit means to the maximum as she leaves, said actuator being then in said operative position in readiness to actuate the hen's register.

7. In a mechanism of the type having a nest, a magnetically operable hen-carried register, and a passage through which the hens enter and leave said nest; a vertically movable barrier across the upper portion of said passage under which the hens must pass, a magnet on the nest-facing side of said barrier adapted to operate the hen-carried register as a hen which has laid leaves the nest, a guard pivotally hung from said barrier to swing inwardly under said magnet, and prevent register-operation when a hen enters the nest, and hen-actuated egg-controlled means for vertically moving said barrier and magnet and insuring positioning of the latter at a lowered register-operating position if a hen leaving the nest has laid therein.

FRED B. KENT.